(12) United States Patent
Raad

(10) Patent No.: US 7,444,260 B2
(45) Date of Patent: Oct. 28, 2008

(54) THERMOGRAPHY MEASUREMENT SYSTEM FOR CONDUCTING THERMAL CHARACTERIZATION OF INTEGRATED CIRCUITS

(76) Inventor: Peter E. Raad, 6540 Briarhaven Dr., Dallas, TX (US) 75240

( * ) Notice: Subject to any disclaimer, the term of this patent is extended or adjusted under 35 U.S.C. 154(b) by 155 days.

(21) Appl. No.: 11/536,055

(22) Filed: Sep. 28, 2006

(65) Prior Publication Data

US 2008/0082288 A1    Apr. 3, 2008

Related U.S. Application Data

(60) Provisional application No. 60/847,170, filed on Sep. 25, 2006.

(51) Int. Cl.
*G06F 15/00* (2006.01)

(52) U.S. Cl. .................................. 702/130; 702/152

(58) Field of Classification Search ................. 702/130, 702/134, 136, 159; 374/43, 45, 130, 161; 250/339.1, 339.11, 370.09
See application file for complete search history.

(56) References Cited

U.S. PATENT DOCUMENTS

| | | | |
|---|---|---|---|
| 5,748,317 A * | 5/1998 | Maris et al. .................. | 356/502 |
| 6,064,810 A | 5/2000 | Raad et al. | |
| 7,173,245 B2 | 2/2007 | Shakouri et al. | |
| 2002/0018510 A1 * | 2/2002 | Murphy et al. ................ | 374/45 |
| 2002/0126732 A1 * | 9/2002 | Shakouri et al. ............ | 374/130 |
| 2005/0257748 A1 * | 11/2005 | Kriesel et al. ............ | 119/51.02 |

OTHER PUBLICATIONS

CCD Thermoreflectance Thermography System: Methodology and Experimental Validation; Pavel L. Komarov, et al.; TIMA Editions/THERMINIC 2006; ISBN: 2-916187-04-9.

A Coupled Thermoreflectance Thermography Experimental System and Ultra-Fast Adaptive Computational Engine for the Complete Thermal Characterization of Three-Dimensional Electronic Devices: Validation; Peter E. Raad, et al.; TIMA Editions/THERMINIC 2006; ISBN: 2-916187-04-9.

A Thermoreflectance Thermography System for Measuring the Transient Surface Temperature Field of Activated Electronic Devices; Pavel L. Komarov, et al.; Semi-Therm 2006.

Coupling Surface Temperature Scanning and Ultra-Fast Adaptive Computing to Thermally Fully Characterize Complex Three-Dimensional Electronic Devices; Peter E. Raad, et al.; Semi-Therm 2006.

(Continued)

*Primary Examiner*—Bryan Bui
(74) *Attorney, Agent, or Firm*—David W. Carstens; Carstens & Cahoon, LLP

(57) ABSTRACT

A system and method to fully characterize the thermal behavior of complex 3D submicron electronic devices. The system replaces and/or supplements laser-based surface temperature scanning with a CCD camera-based approach. A CCD camera records multiple points of light energy reflected from an integrated circuit to obtain a temperature measurement. The system is used to non-invasively measure with submicron resolution the 2D surface temperature field of an activated device. The measured 2D temperature field is used as input for an ultra-fast inverse computational solver. The system couples measured results and computations in a novel approach, making it possible to extract geometric and thermal features of a device, and to obtain critically needed temperature distributions over the entire 3D volume of that device, including regions that are physically or optically inaccessible. The obtained distributions reflect the real, and not merely theoretical, physical construction and thermal behavior of that device.

20 Claims, 11 Drawing Sheets

OTHER PUBLICATIONS

V. Quintard et al., Laser beam thermography of circuits in the particular case of passivated semiconductors, Microelectronic Engineering 31 (1996) 291-298.

S. Grauby et al., High resolution photothermal imaging of high frequency phenomena using a visible charge coupled device camera associated with a multichannel lock-in scheme, Review of Scientific Instruments, vol. 70, No. 9, Sep. 1999, American Institute of Physics, 3603-3608.

G. Tessier et al., Quantitative thermal imaging by synchronous thermoreflectance with optimized illumination wavelengths, Applied Physics Letters, vol. 78, No. 16, 16n Apr. 2001, American Institute of Physics, 2267-2269.

Pasto, A.E. et al., "High Temperature Materials Laboratory, Eleventh Annual Report: Oct. 1997 through Sep. 1998". Technical Report ORNL/TM-2000/2, Oak Ridge National Lab., TN (US). Published Mar. 1, 2000. Retrieved from the internet; ,URL: http://www.osti.gov/bridge/servlets/purl/754735-RuC0aM/webviewable/754735.PDF>.

A CCD Thermoreflectance Thermography System and its Calibration,? P. L. Komarov, M. G. Burzo, and P. E. Raad, Thermal Challenges in Next Generation Electronic Systems II (THERMES II 2007), Santa Fe, NM, Jan. 7-10, 2007.

Thermal Characterization of Embedded Electronic Features by an Integrated System of CCD Thermography and Self-Adaptive Numerical Modelling,? P. E. Raad, P. L. Komarov, and M. G. Burzo, Thermal Challenges in Next Generation Electronic Systems II (THERMES II 2007), Santa Fe, NM, Jan. 7-10, 2007.

* cited by examiner

Influence of the bottom oxide thickness

Influence of the heat source length

Convergence of optimization path toward
final solution at h = 1,413 Å and L = 212.5 μm Optimal numerical solution surface temperature contours Experimental signature surface temperature contours Contours of 3D temperature field from optimal numerical solution Contours of 3D temperature field from optimal numerical solution

THERMOGRAPHY MEASUREMENT SYSTEM FOR CONDUCTING THERMAL CHARACTERIZATION OF INTEGRATED CIRCUITS

CROSS-REFERENCES TO RELATED APPLICATIONS

This application claims the benefit of provisional Application No. 60/847,170 filed Sep. 25, 2006.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to semiconductor thermography and more specifically to a system and method for measuring the thermal behavior of integrated circuits.

2. Description of Related Art

The present invention references Applicant's U.S. Pat. No. 6,064,810 (the "'810 patent"), the contents of which are incorporated herein by reference.

As semiconductor devices become physically more complex with shrinking feature sizes and higher local power densities, cooling problems multiply, which can lead to a decrease in performance and reliability. Thus, understanding and determining the thermal behavior of modern electronics has become a key issue in their design. As a result, there is a critical demand for methods that can be used to determine the temperature of features at the submicron level, particularly when most important features are physically inaccessible. Computational approaches can provide insight into the internal thermal behavior of such complex devices, but can be limited by the inherent necessity of modeling the heat sources, which in the case of self-heating microelectronic devices, are the result of electrical fields whose exact shapes and locations are difficult to specify with reasonable certainty. Moreover, such devices can actually experience irreversible changes in thermo-physical properties and/or geometries that cannot be otherwise predicted from theory or monitored. Experimental approaches can also be helpful in determining thermal behavior, but require either physical access or a visual path to the region of interest. Contact methods, for example, present the difficulties of having to access features of interest with an external probe, or in the case of embedded features, fabricate a measuring probe into the device, and then having to isolate and exclude the influence of the probe itself. Non-contact methods, on the other hand, can provide surface temperature profiles, but in and of themselves cannot impart information on internal behavior. In other words, these methods provide a two-dimensional perspective on what otherwise is, in the case of stacked complex devices, an intricate three-dimensional thermal behavior.

Therefore, a need exists for an improved and more comprehensive method of conducting three-dimensional thermal characterization of semiconductor devices with shrinking characteristics and higher operating speeds. Further, a need exists for a non-invasive method of conducting thermal characterization that accurately measures the thermal characteristics without imparting its own energy into the system. Further, a need exists for a method of conducting thermal characterization in situ and at the sub-micron level of today's devices.

BRIEF SUMMARY OF THE INVENTION

The present invention overcomes most of the disadvantages and problems associated with thermal characterization of submicron semiconductor devices. It combines a system capable of mapping the surface temperature of a complex device with high spatial and temporal accuracy, a computational engine capable of rapidly and accurately resolving the geometric and material complexities of a full three-dimensional microelectronic device, and a method for utilizing the system to accurately and efficiently obtain a fully three-dimensional thermal characterization of an active micro-device. With the independent information from the experimental measurements it becomes possible to mitigate the lack of knowledge in the source model parameters which directly affect the usefulness of the computational results.

In accordance with one feature of the invention, the system uses a variable light source to illuminate the surface of an active micro-device. A CCD camera system then takes a high resolution image of the reflected light and produces a measure of the change in thermoreflectance for a given input power across the surface of the device. This change in reflectivity translates to a two-dimensional temperature distribution across the visible surface of the device. The two-dimensional data is then used by the computational engine to compute a three-dimensional temperature field of the entire device.

In accordance with another feature of the invention, the system uses a laser light to measure the change in thermoreflectance for a given input power across the surface of an active micro-device. This change in reflectivity translates to a two-dimensional temperature distribution across the visible surface of the device. The two-dimensional data is then used by the computational engine to compute a three-dimensional temperature field of the entire device.

Accordingly, it is one general object of the invention to provide a means for rapidly measuring the two-dimensional surface temperature of an active micro-device. It is another general object of the invention to provide a means for conducting a full three-dimensional thermal characterization of an active micro-device. It is another general object of the invention to perform this characterization on an active micro-device in situ. It is another general object of the invention to perform this characterization with sub-micron spatial resolution. It is another general object of the invention to perform this characterization non-invasively. The invention accordingly comprises the features described more fully in the remainder of the specification, and the scope of the invention will be indicated in the claims. Further objects of the present invention will become apparent in the following detailed description read in light of the drawings.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numbers refer to like parts throughout the several views, wherein.

Figure 13A:
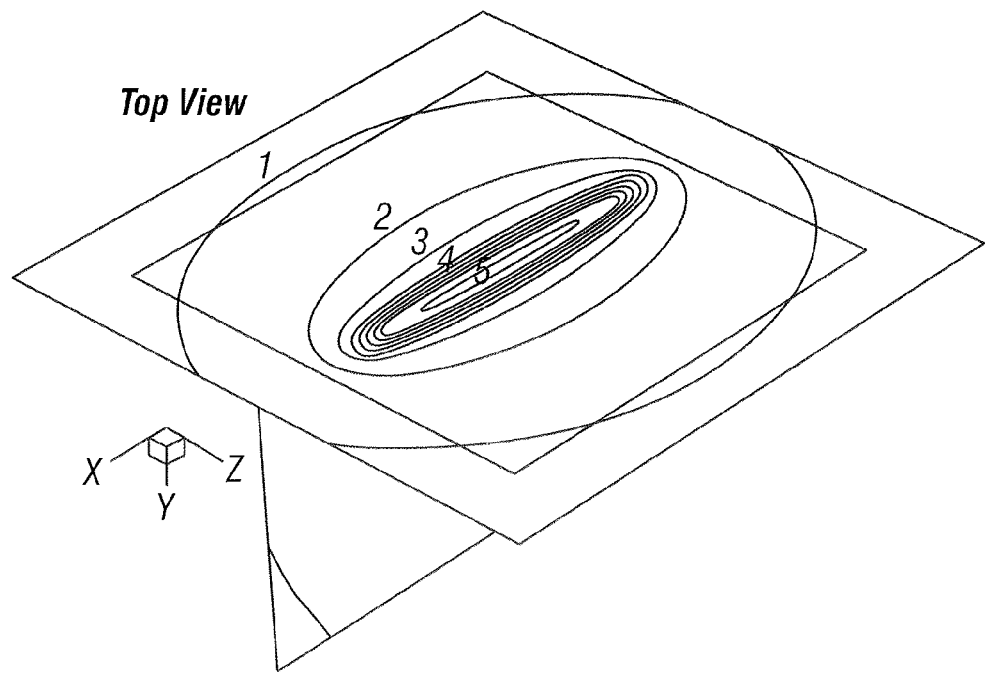
Figure 13B:
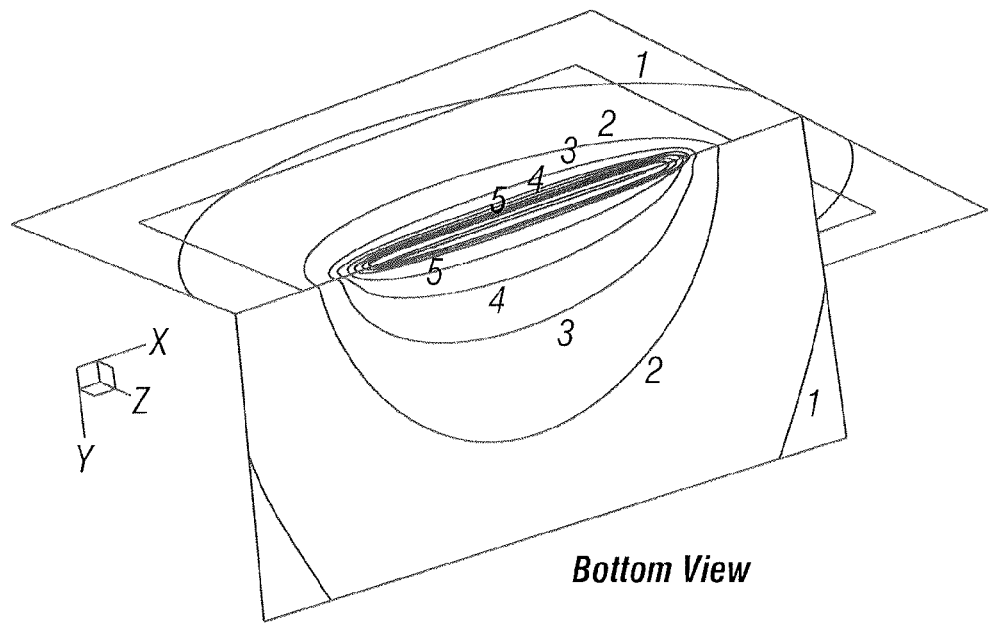
Figure 14:
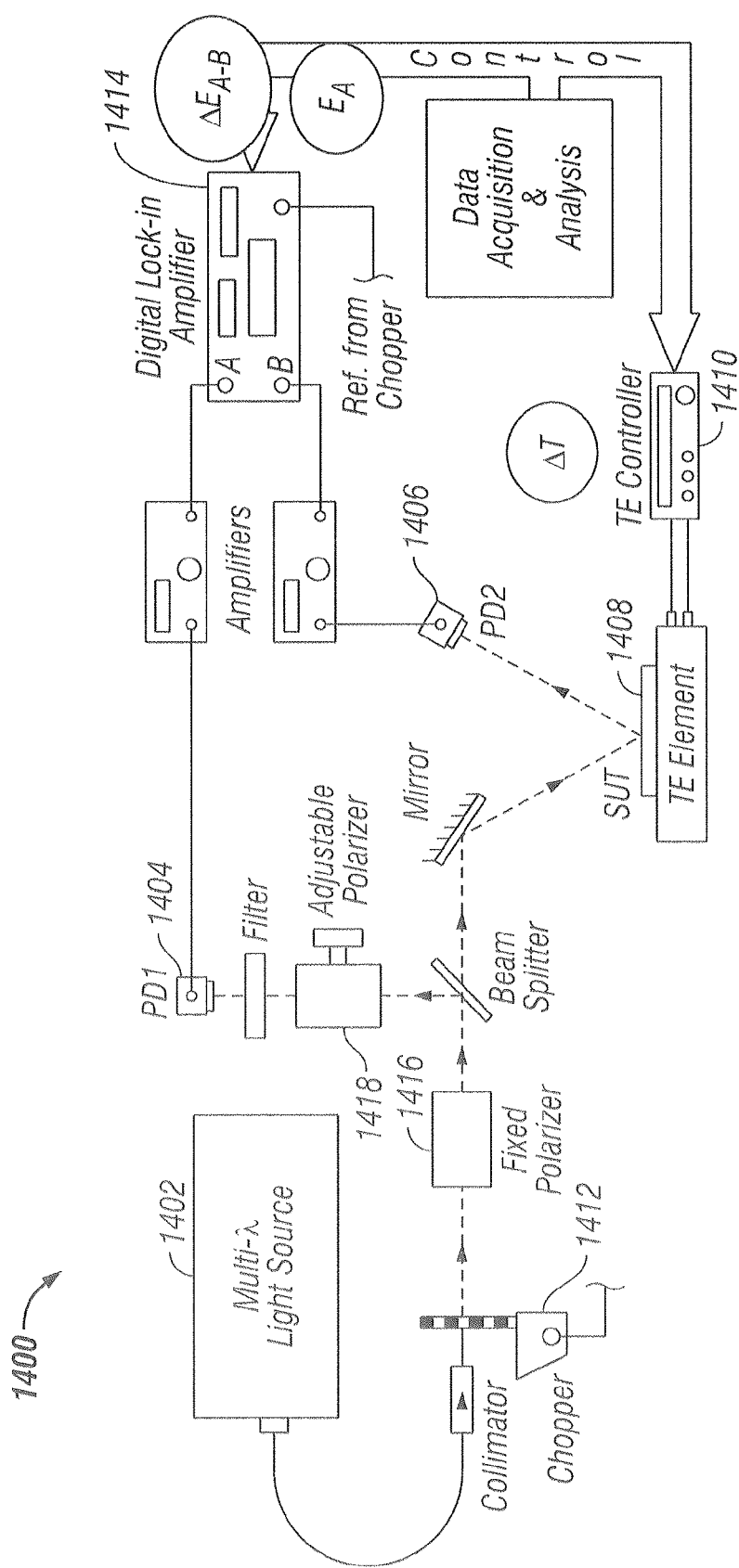

FIG. 13 provides a top view (FIG. 13A) and bottom view (FIG. 13B) of a contour of the optimal three-dimensional numerical thermal solution of the test device. For clarity, only two slices are shown and the spatial domain is restricted to the region surrounding the test device heater; and FIG. 14 is a schematic representation of another embodiment of a system for determining the thermoreflectance coefficient of a device under test by utilizing a variable wavelength light source and two photodetectors.

Where used in the various figures of the drawing, the same reference numbers designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
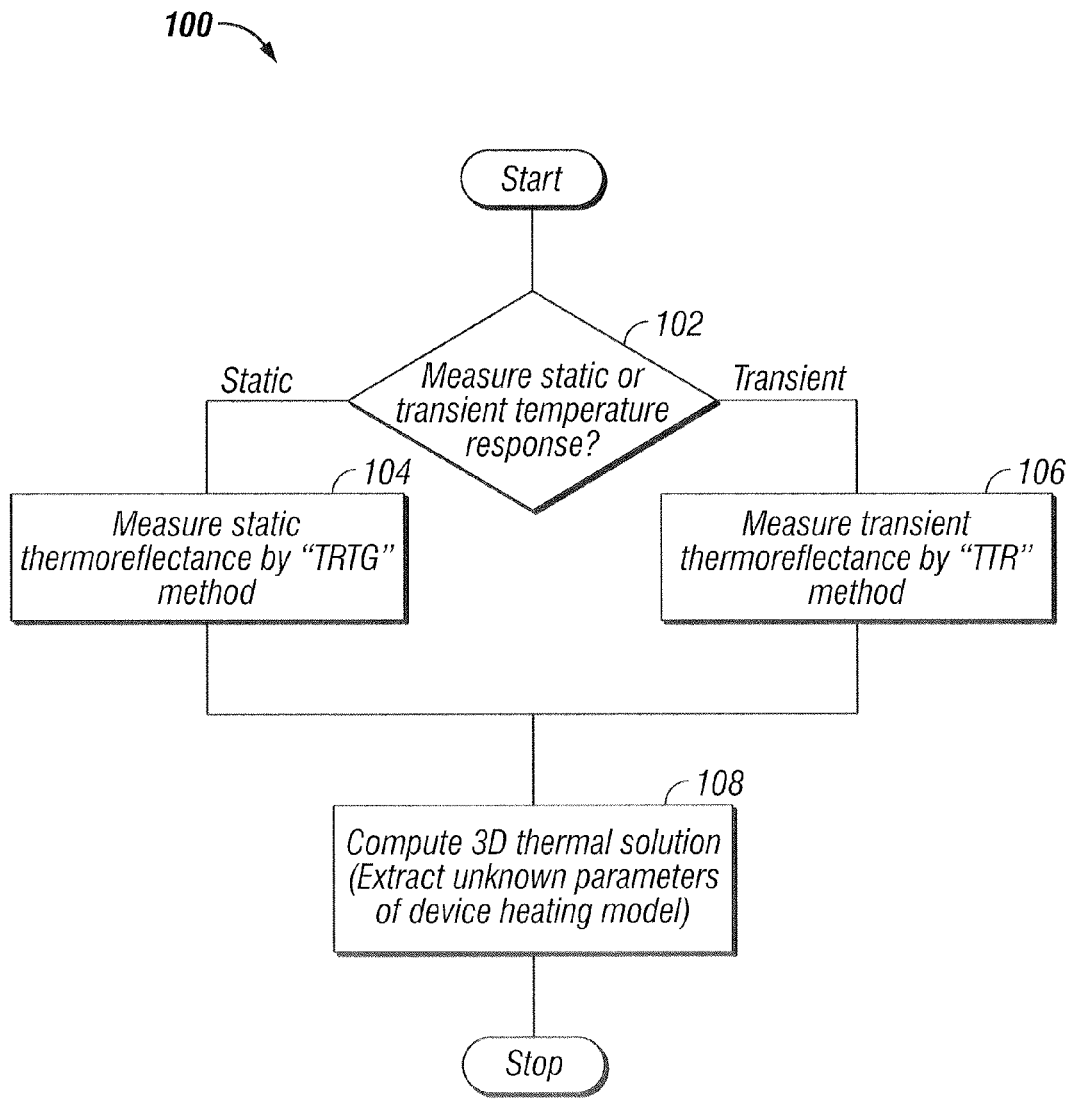
FIG. 1 is a high-level flow diagram of the Thermography Measurement system operation as a whole.

FIG. 1 represents the high-level flow diagram of the basic operation of the present invention as it is used to measure the three-dimensional temperature field distribution of an active semiconductor micro-device. To conduct a full three-dimensional temperature characterization of a device requires essentially three steps 100. First, because different equipment is required, a decision must be made as to whether the static or transient thermal distribution is sought 102. Second, a two-dimensional thermal measurement is conducted. If static data is required, then CCD camera-based Thermoreflectance Thermography system (TRTG) is used 104. If transient data is required, then a laser-based TRTG is used 106. Third, a three-dimensional thermal characterization is computed from the two-dimensional data and various device parameters 108.

The present invention is based on the thermoreflectance (TR) method, where the change in surface temperature is measured by detecting the change in the reflectivity of the sample. Since the change in reflectivity per unit temperature (i.e., thermo-reflectance coefficient, $C_{TR}$) is of the order of $10^{-3}$-$10^{-5}$ $K^{-1}$ for most electronic materials, the system had to be designed, built, and fine-tuned to achieve the levels of certainty required for successful measurements.

The measurement methodology requires two steps. First, the coefficient of thermal reflectance ($C_{TR}$) must be determined for each of the surface materials to be scanned (calibration). Second, the changes in the surface reflectivity as a function of changes in temperature are measured with sub-micron spatial resolution using either a CCD camera or a photodetector.

Figure 2:
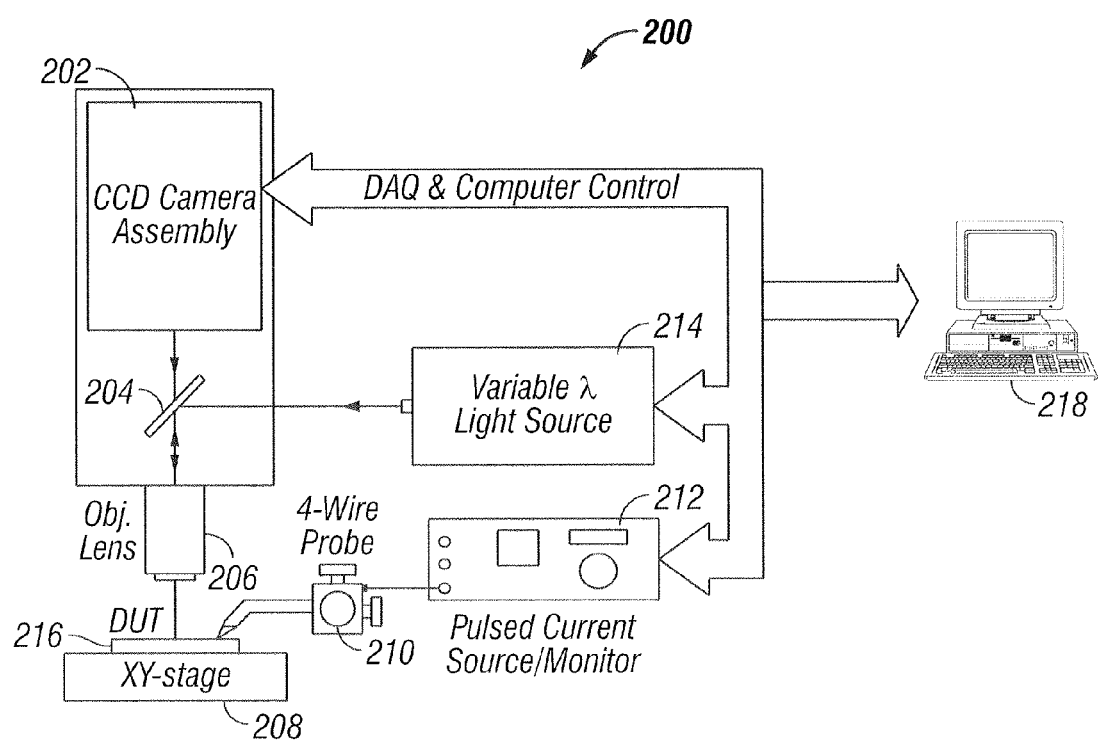
FIG. 2 is a schematic representation of one embodiment of the Thermoreflectance Thermography system (TRTG) of the present invention, having only a CCD camera assembly for static and slow transient measurements.
Figure 3:
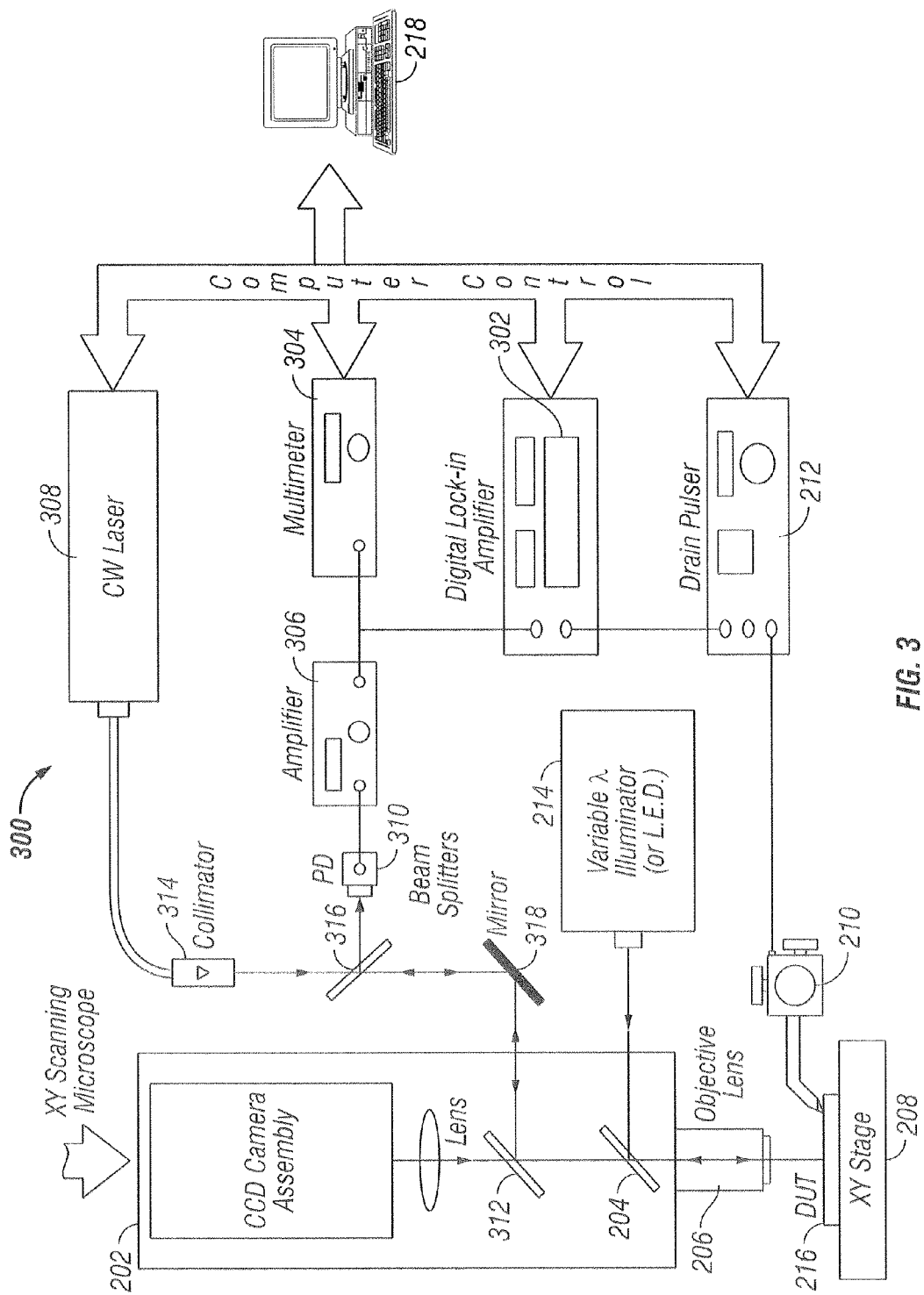
FIG. 3 is a schematic representation of another embodiment of the TRTG of the present invention, having both a CCD camera assembly for static and slow transient thermoreflectance measurements and a CW laser assembly for transient thermoreflectance measurements.

FIG. 2 shows a schematic of one embodiment of the TRTG 200. This embodiment uses only a CCD camera assembly 202 for conducting measurements. As mentioned previously, this configuration is primarily useful for static and slow transient measurements only. FIG. 3 shows a schematic of another embodiment of the TRTG 300. This embodiment combines two different techniques for acquiring the reflectivity change induced by the temperature change on the surface of the activated device, namely, (i) a multipoint CCD camera 202 approach, and (ii) a single-point laser-based 308 approach. With the addition of the CW laser 308, this embodiment provides for both static and transient thermo-reflectance measurements.

FIGS. 2 and 3 provide similar schematic representations of the CCD camera-based TRTG. In the case of the multipoint approach, the change in reflectivity is captured as the change in the intensity of the reflected light on each element (pixel) of the CCD camera 202. The advantage of this approach is that it is simpler to use, easier to vary the wavelength of the probing light 214 (to maximize the $C_{TR}$ coefficient), has excellent spatial resolution (as low as 200 nm with a 100× objective lens, and potentially lower with higher magnification lenses) and is orders of magnitude faster than the single-point approach. Current sensor technology limitations include that the CCD approach captures slower transients than possible with a photodetector based approach. As CCD camera technology improves, the present time resolution gap between CCD and photodetector approaches will close.

The device under test 216 is mounted on a platform 208 such as those used in wafer fabrication. The present invention utilizes a ThermoChuck® temperature inducing vacuum platform for mounting and testing semiconductor wafers on a probing station. However, one skilled in the art will appreciate that any wafer heating element will suffice. After mounting, the DUT 216 is connected to a pulsed current source 212 using 4-wire probes 210. The current source 212 and probes 210 allow for the DUT 216 to be powered during testing.

A variable wavelength light source 214 directs its light through a beam splitter 204, where it is reflected through the objective lens 206 and onto the DUT 216. The light reflected from the DUT 216 travels upward to the CCD camera 202 where it is processed and measured. A computer 218 controls the data acquisition and system operation.

FIG. 3 provides a schematic representation of the laser-based TRTG. The probing laser beam from a CW laser 308 is groomed with a collimator and then directed through the CCD camera's optics (beamsplitters 312 and 204) utilizing beamsplitter 316 and a mirror 318. The beam is projected through the objective lens 206 perpendicularly to the heated surface of the device under test (DUT) 216 from which it reflects back along the optical path to the sensitive area of the photodiode 310.

The intensity of the reflected light depends on the reflectivity of the DUT's surface 216, which in turn depends upon the surface temperature. To overcome the inherently low signal to noise ratio, the activation voltage of the DUT 216 is modulated 212, resulting in a modulated photodetector signal that can more easily yield the useful signal from the raw photodetector signal output. The photodetector signal, containing the change in surface reflectivity caused by the temperature variations of the DUT 216, is pre-amplified 306 and then acquired with a lock-in amplifier 302 (or an oscilloscope 304) and is then scaled according to the calibrated data ($C_{TR}$). The key difference between the two techniques is that the lock-in approach cannot be used to measure transient temperate fields, while the oscilloscope technique makes it possible to measure transient temperature with microsecond or better temporal resolution. However, the oscilloscope technique is less accurate than the lock-in technique. The temperature field over a desired area of an active device 216 can still be mapped by repeating the procedure at multiple physical locations, which is achieved by precisely moving the laser beam with submicron resolution.

Figure 6:
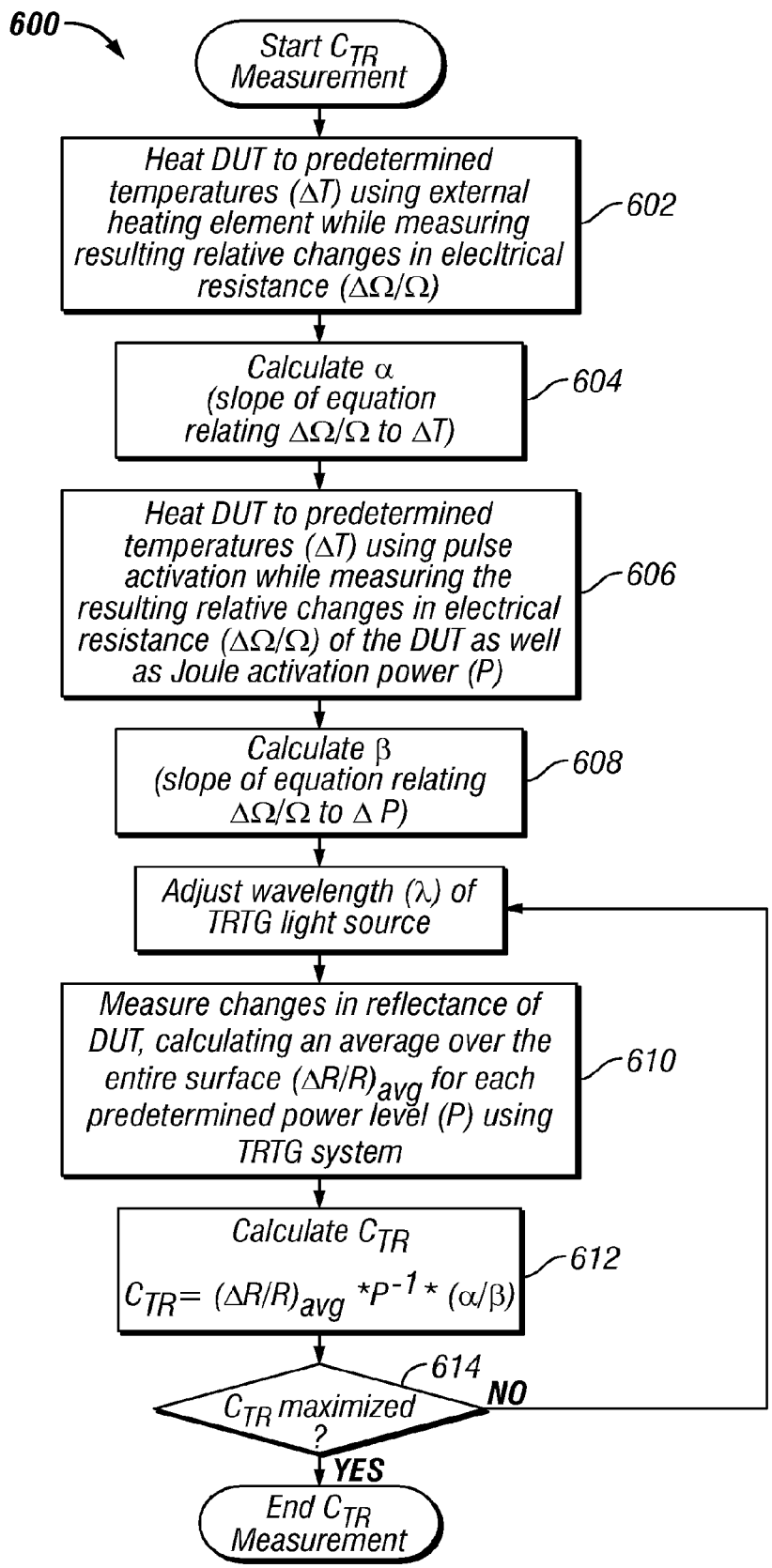
FIG. 6 is a flow diagram indicating the steps required to compute the thermoreflectance coefficient ($C_{TR}$) for a device under test using the TRTG.

FIG. 6 is a flow-diagram of the steps required to determine the $C_{TR}$ using the TRTG CCD method 600. The first step involves determining the temperature coefficient of resistance ($\alpha$) for the device under test by heating the latter to known temperature elevation levels ($\Delta T$) and measuring the resulting relative changes in electrical resistance ($\Delta\Omega/\Omega$) by the use of a standard four-probe method 602. The resulting data are used to determine $\alpha$, which is the slope of the linear equation relating $\Delta\Omega/\Omega$ to $\Delta T$ 604. The TRTG system 300, wafer chuck 208, and probes 210 are situated on a probing station designed so as to render the measurements insensitive to ambient vibrations and to the small movements caused by the thermal expansions experienced in the system.

The second step is similar to the first one, except that the DUT 216 is heated by pulse activation and the wafer chuck temperature is held at room temperature. As the DUT 216 is activated with various specified levels of DC current, the four-probe approach is used to simultaneously record both the resistance of the microresistor strip as well as the Joule activation power 606. Thus, the relative change in electrical resistance, $\Delta\Omega/\Omega$ as a function of applied electrical power (P) is obtained, where the slope of the linear dependence is hereafter referred to as $\beta$ 608.

Given $\alpha$ and $\beta$, the relationship between power, P, and resistor average temperature rise, $\Delta T$, can be easily calculated. Next, the TRTG system 300 is used to measure the changes in reflectance, $\Delta R/R$, over the micro-resistor surface at prescribed electrical power levels, P, by recording the relative light intensity for each pixel of the CCD 610. To obtain $C_{TR}$ as a property of the surface material of the DUT 216 at each light wavelength, the recorded fields of intensity change are averaged over the active area of the heater to obtain an average $(\Delta R/R)_{avg}$. Finally, the actual $C_{TR}$ for the DUT 216 is calculated from the overall relationship $C_{TR}=(\Delta R/R)_{avg}\cdot P^{-1}\cdot(\alpha/\beta)$ 612.

The resulting value of $C_{TR}$ for the DUT 216 at a given light wavelength ($\lambda$) can then be compared to previously obtained values 614. Different values of $\lambda$ produce different values of $C_{TR}$. Therefore, the $\lambda$ yielding the highest $C_{TR}$ is the best wavelength to use during the temperature scans. In order to maximize the signal to noise ratio, it is important to use a light source whose wavelength produces the maximum value of $C_{TR}$ for the material layer being examined.

The primary impact of the methodology described is that it provides an approach for measuring $C_{TR}$ in situ, at any wavelength of the illumination light 214, and for surface materials of real microelectronic devices, as opposed to using generic data from the literature, which are limited and tend to be inaccurate for a specific device configuration of interest. Of potentially greater significance is the fact that by combining the experimental TRTG method and the computational system, it also becomes possible to determine the $C_{TR}$ of surface materials on the device other than the specific material that was directly involved in the calibration stage.

An additional method of determining CTR involves using a variable wavelength light source and two photodetectors. FIG. 14 shows such a device 1400. The multi-wavelength light source 1402 illuminates the DUT surface at a specific wavelength, generated by passing a Xenon white light through a monochromator grating 1412 adjusted to produce a 5-nm line width. The wavelength can be specified with a precision of 0.5 nm. The probing light is divided into two beams, one collected on a reference photodetector 1406 ($PD_2$) and the other collected on the primary photodetector 1404 ($PD_1$) after being reflected from the sample surface. The light intensities of the two branches are balanced to within 1% by the use of a pair of polarization devices 1416 and 1418.

The DUT 1408 is heated by a thermoelectric element 1410 and a K-type thermocouple is used to measure the surface temperature of the sample as closely as possible to the lighted area. Since the multi-wavelength light source 1402 produces a non-planar light front, the smallest possible probing surface area is on the order of 3-5 mm. The base level of reflected energy (E) at room temperature is first recorded, and then the sample is heated to a stabilized prescribed temperature rise, $\Delta T$. A lock-in-amplifier 1414, locked on the frequency and phase of the modulated light source, is used to measure the change in reflected energy ($\Delta E$) resulting from the rise in surface temperature. Once $\Delta E$ and E are known, the ratio of the change in reflectivity ($\Delta R$) to the base reflectivity (R) becomes known since $\Delta E/E=\Delta R/R$. Finally, the $C_{TR}$ coefficient can be calculated from its definition, $C_{TR}\equiv(\Delta R/R)/\Delta T$.

The above approach provides very good results and the flexibility of prescribing different light wavelength, but as noted above, the spot size is too large to measure the $C_{TR}$ of actual integrated circuit devices in situ. Also, the use of external heating (e.g., thermoelectric element) introduces systematic uncertainties associated with thermal expansion of the device and the need for measuring the temperature rise with an external probe (e.g., thermocouple). In combination, the major disadvantage is connected to the differences in scales between the device used for calibration and the significantly smaller device in whose surface temperature is of interest.

Figure 4:
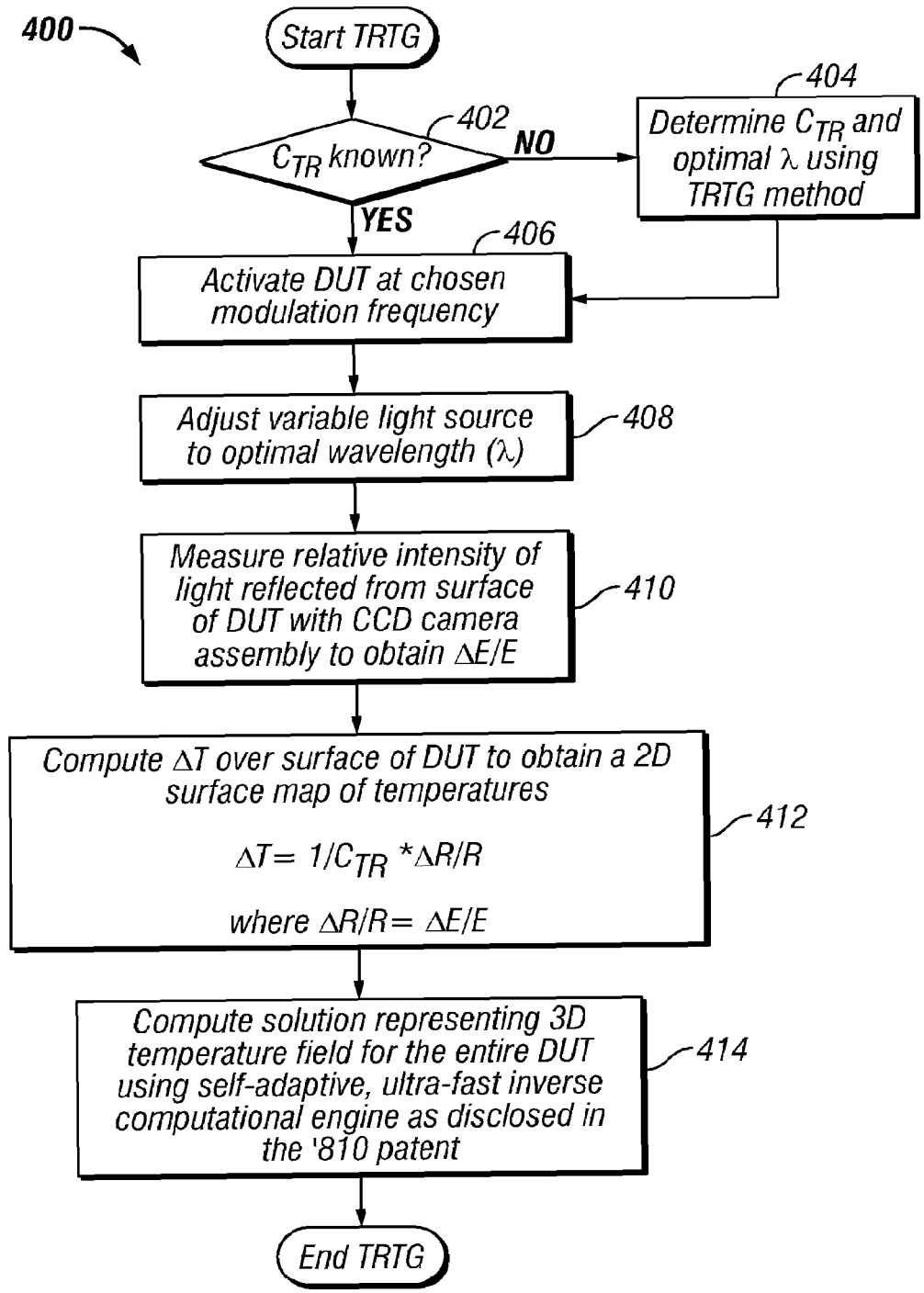
FIG. 4 is a flow diagram indicating the steps required to compute a three-dimensional temperature field for a device under test using the CCD camera of the TRTG.

The flow diagram of FIG. 4 provides the steps 400 necessary to take a static two-dimensional temperature measurement of the surface of the DUT 216. The first step is to determine if the $C_{TR}$ is known for the device 402. If not, then a $C_{TR}$ measurement is conducted 404 using the previous TRTG procedure (FIG. 6). Next, the DUT is activated 406 and allowed to stabilize in temperature. Next, the wavelength of the variable light source 214 is set to the optimum wavelength ($\lambda$) determined in the $C_{TR}$ calibration 408. One skilled in the art will recognize that a fixed wavelength light source may also be utilized so long as the wavelength provided is one that yields a significantly high $C_{TR}$ which improves the signal-to-noise ratio. Next, a "snapshot" of the light energy reflected from the surface of the DUT 216 is then taken by the CCD camera 202 for processing 410. This pixel-by-pixel energy recorded by the CCD camera 202 is then processed to compute a two-dimensional thermal characterization of the device's surface 412. This is possible because the change in temperature for a given spot on the device's surface is directly related to the change in the spot's reflectivity ($\Delta T=1/C_{TR}*\Delta R/R$). Once the two-dimensional surface characterization is obtained, the results are processed to compute a three-dimensional temperature solution for the overall device 414.

Figure 5:
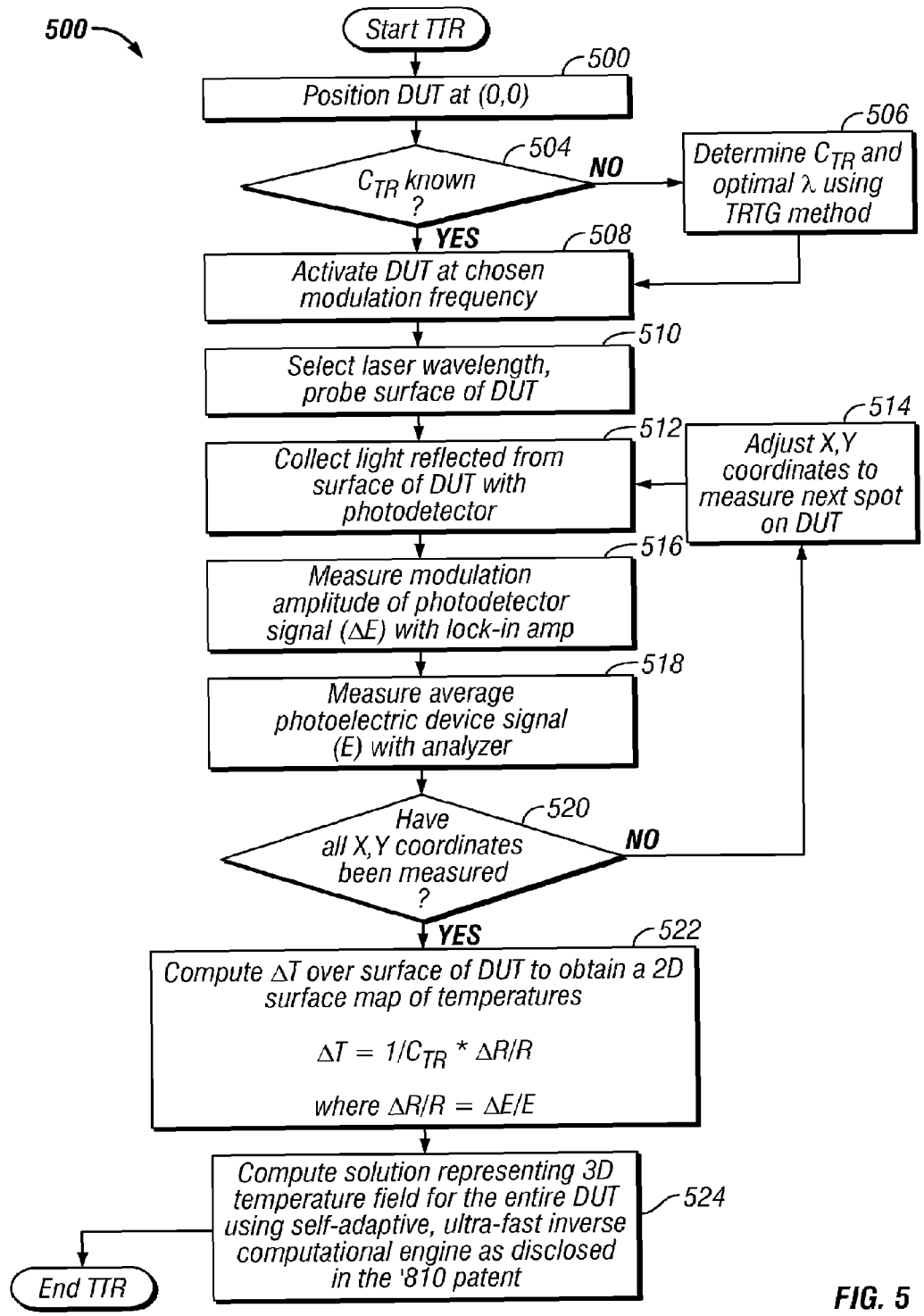
FIG. 5 is a flow diagram indicating the steps required to compute a three-dimensional temperature field for a device under test using the CW laser of the TRTG.

The flow diagram of FIG. 5 provides the steps 500 necessary to take a transient two-dimensional temperature measurement of the surface of a device. This process is more involved as it requires movement of either the DUT 216 or the CCD camera assembly in the XY coordinate system. The first step is to properly position the DUT 216 beneath the objective lens 206 such that the probing laser beam will contact the DUT 216 at the origin of the XY coordinate system 502. Next, determine if the $C_{TR}$ is known for the device 504. If not, then a $C_{TR}$ measurement is conducted 404 using the previous TRTG procedure 506. Next, the DUT is activated with a drain pulser at a chosen modulation frequency 508. Modulating the signal driving the DUT increases the signal to noise ratio at the photodetector 310. Next, the laser wavelength ($\lambda$) is chosen to that which yields an optimum $C_{TR}$ 510. The probing laser beam is then directed through the objective lens 206 and onto the surface of the DUT 216. Next, the light energy reflected from a particular spot on the device's surface is collected by the photodetector 310 and measured 512. Either a lock-in amplifier or an oscilloscope is then used to measure the modulation amplitude of the photodetector signal to determine $\Delta E$ 516. Next, the photodetector signal is averaged (E) 518. If there are any other spots on the DUT to be measured 520, then either the DUT 216 or the CCD camera assembly 202 is moved in the XY coordinate space 514. If the entire surface of interest of the DUT has been measured, then the two-dimensional thermal characterization of the device's surface is computed ($\Delta T=1/C_{TR}*\Delta R/R$, where $\Delta R/R$ equals $\Delta E/E$) 522. Once the two-dimensional surface characterization is obtained, the results are processed to compute a three-dimensional temperature solution for the overall device 524.

The numerical computing thermal modeling engine is capable of simulating the transient thermal behavior of active multi-layered devices whose dimensions vary over several orders of magnitude and where the thermophysical properties of the materials used may not be isotropic. The thermal modeling engine is used for solving the required three-dimensional heat transfer problem of the corresponding physical device. The surface temperature field (previously measured using the TRTG system) is used as an input signature for an optimization scheme that varies control parameters (e.g., source power, length) until the RMS error between the computed solution and the input signature is minimized.

The novel approach begins by solving the corresponding steady-state problem by the use of a grid nesting technique as described in the inventor's '810 patent. Since the physical dimensions of the various materials used in modeling high performance electronic devices vary greatly, a uniform mesh that resolves all of the details in three dimensions results in a prohibitively large computational grid. A common method for dealing with dimensional variation is to skew the mesh and concentrate more grid points in areas where higher resolutions are needed. The shortcoming of using a biased-mesh approach to resolve the geometry is that the problem geometry, and not the temperature gradients, will end up dictating the meshing. The meshing strategy used in the development of the numerical engine was set on ensuring that it is (i) automatic and adaptive, (ii) independent of user expertise, and (iii) independent of materials (including air), geometry features, embedded vias, and heat source locations. The approach makes it possible to start with the full 3D geometry of a real device in all of its complexity, and then uses a physics-based automatic error predictor to focus the entire available computational power on only those regions that require further refinement in order to achieve the level of acceptable error prescribed by the analyst. The power of this method is that it uses effective thermal properties that are consistent with the local grid spacing at the particular grid level in use. As a result, dealing with air, embedded vias, and ultra-thin multi-layered structures requires no special treatment.

The fidelity of a computational solution depends directly on the accuracy of the material properties and geometric characteristics of the features making up the device of interest. Since thermal properties of thin-films vary from those of bulk materials, it is necessary for the numerical simulation to use the real values of the thermal conductivity for all of the materials making up the system under study. The previously described TTR measurement system can also be used to determine any unknown properties of thin-film materials and their interface resistances.

In order to carefully characterize the geometry of a device of interest, an ellipsometer was used to measure the thicknesses of transparent layers as well as to confirm the optical properties of surface metals. In addition, a profiler was used to measure the thicknesses of various opaque and transparent layers making up the device.

Figure 7:
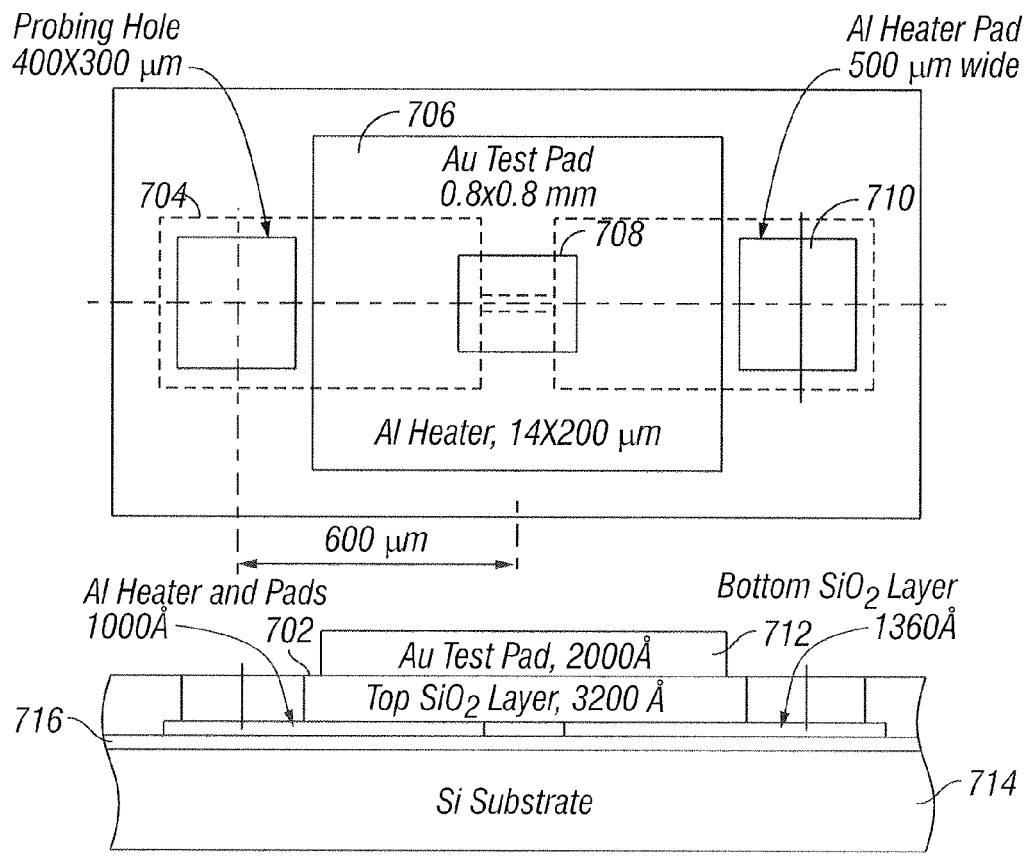
FIG. 7 is a schematic representation of a micro-resistor device ("test device") used to prove the concept and validate the present invention. The geometric parameters of the device are indicated in the drawing.

With reference to FIG. 7, to prove the concept and validate the described method, basic reference aluminum micro-resistor devices 700 buried in a layer of silicon dioxide 714 were constructed. In the micro-resistor device, shown schematically in FIG. 7, an aluminum (Al) strip heater 708 is sandwiched between top 702 and bottom 716 oxide layers in the vertical direction, and between two Al activation pads (704 and 710) in the horizontal direction. When activated at known electrical power levels, the known heat source will generate a three-dimensional temperature field throughout the device. Since the approach calls for measuring the temperature signature on the surface of the device, a gold (Au) layer 706, 712 was deposited over the anticipated area of interest, which includes the heat source 708 and large surrounding regions. Gold was chosen since when used in conjunction with an LED light source at 485 nm, it will maximize the $C_{TR}$ value in the TRTG technique. However, one skilled in the arts will appreciate that other combinations of surface materials and probing light wavelengths can be effectively used without straying from the present invention.

The simple construction of this micro-resistor device makes it possible to specify and measure all essential heat transfer problem parameters. Specifically, (i) the geometry of the different layers can be controlled in the fabrication process and later measured for confirmation; (ii) the oxide layers and Al strip provide a Joule heat source with known uniform power distribution; and (iii) the large pads make it possible to use a four-wire scheme to simultaneously activate the strip heater and measure its electrical power. The validation device has a heater with a width of 14 µm and a length of 200 µm. All other pertinent geometric parameters are provided in FIG. 7.

By using the experimental system and combining it with the numerical approach presented above it is possible to solve the inverse conduction problem associated with a complex, multi-layered, deep submicron electronic device in order to infer the thermal behavior of the embedded features that cannot be otherwise accessed. The inverse solution is obtained by varying key parameters that define the heat transfer problem under consideration. For the aforementioned test micro-resistor, these parameters include the size and location of the heater strip, its power and distribution, the thicknesses of the top and bottom layers, and their thermal properties. One skilled in the art would appreciate that a solution that comprehends all of these variables would be impractical. Furthermore, many of these parameters can be either directly measured (e.g., thermal properties, applied power, thicknesses of layers) and/or have smaller influences on the final temperature distribution in the device (e.g., layers of $SiO_2$ and Au above the heater).

Since heat flows primarily toward the substrate, the thickness of the bottom oxide layer 716 is expected to strongly affect the temperature distribution because of the resistance that this layer presents. Therefore this parameter was chosen for its sensitivity on the final result. A second parameter was chosen to be the length of the heat source because (i) it cannot be directly measured and (ii) it is expected to be longer than the length of the heater strip itself because of the end effects at the junction between the aluminum heater strip and its activation pads. In fact, one would expect that the end effects would extend beyond the strip by a distance that scales with the heater's width.

Figure 8:
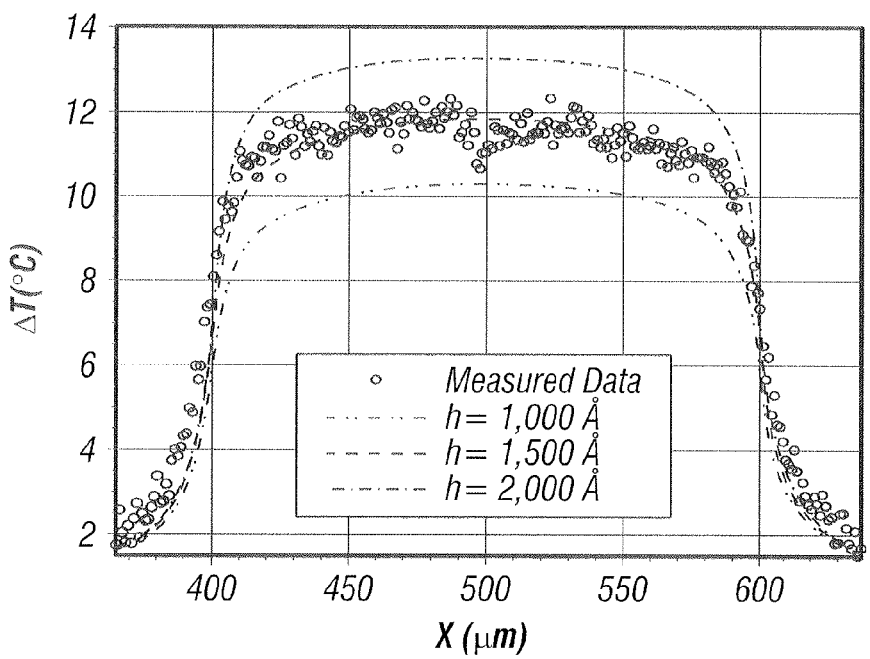
FIG. 8 is a graph comparing the experimental data achieved with the corresponding numerically computed temperature distributions in the test device of FIG. 7. The bottom oxide thickness of the device was varied while the heat source length was held constant.
Figure 9:
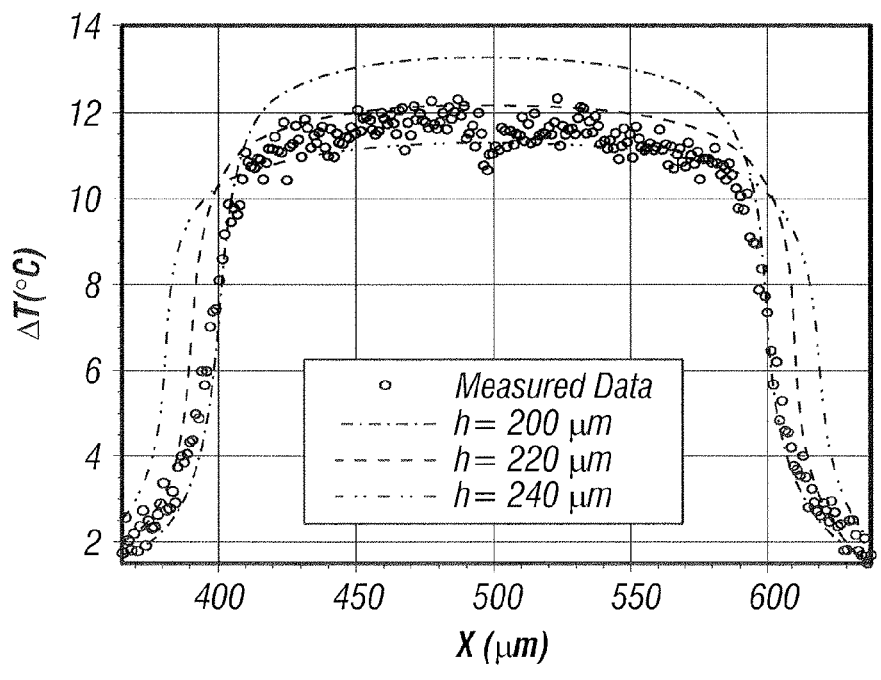
FIG. 9 is a graph comparing the experimental data achieved with the corresponding numerically computed temperature distributions in the test device. The bottom oxide thickness of the device was held constant while the heat source length was varied.

FIGS. 8 and 9 compare the experimental data along the mid-plane of the heater strip to the corresponding numerically computed temperature distributions for different values of the bottom oxide thickness and for a fixed heat source length of 200 µm. As expected, thicker layers of bottom oxide result in higher strip temperatures (FIG. 8). As indicated in FIG. 8, the numerical temperature distribution for the thickness of 1,500 Å fits nicely the measured data in the center of the heater, X∈[400,600], but misses inside the pad areas. The discrepancy is due to the end effect previously mentioned.

To examine the end effects, the bottom oxide thickness was held fixed at 2000 Å, and the heat source length was varied as depicted by the results in FIG. 9. Extending the heat source length beyond the ends of the strip heater pulls the temperature curves outwardly toward the experimental data at the lower temperatures. However, the agreement between the numerical and experimental distributions becomes worse toward the center of the domain. Simply extending the rectangular heat source, as done here, captures the spherical nature of the heat distribution at the pad-heater junction to a first order approximation. In order to more precisely simulate the end effects, one would have to introduce a more sophisticated heat power distribution model in this region.

Nevertheless, taken together, the results of FIGS. 8 and 9 highlight the importance of both physical parameters and hence the need to optimize over both of them simultaneously. The optimization method used in this work is a variant of the "steepest descent" method. The search begins with a numerical solution of the heat transfer problem at nominal values of the two parameters being considered, i.e., bottom oxide thickness (h) and heat source length (L). This numerical solution is compared with the measured signature field 708 on the gold pad 706 at every common location to compute an RMS error. Then, additional trial solutions and associated errors are obtained at neighboring pair values of h and L in the two-dimensional parameter space. Evaluation of the errors at the nominal and eight neighboring pairs provides the direction for modifying h and L in order to decrease the error. This process continues until the changes in both h and L are acceptably small.

Figure 10:
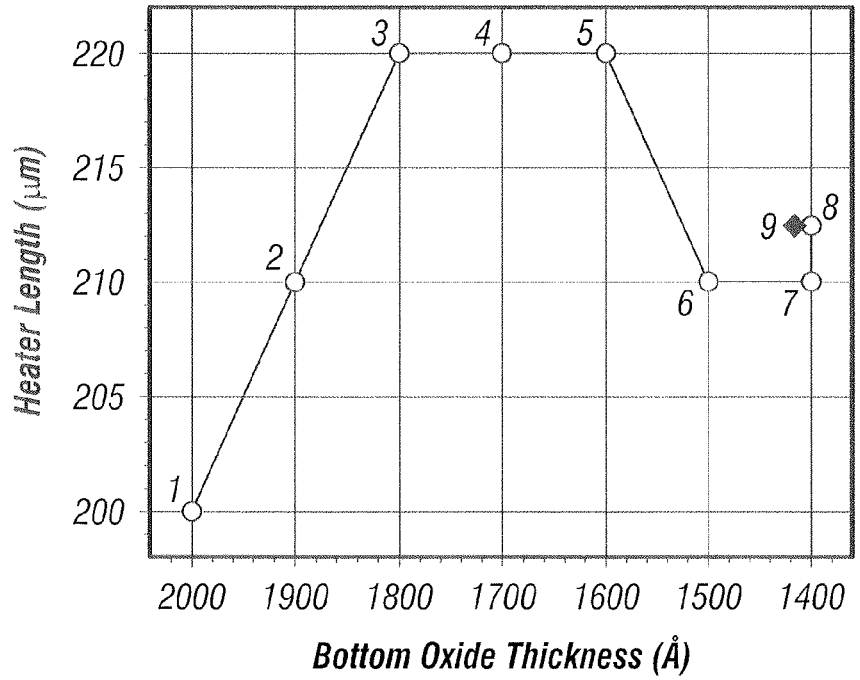
FIG. 10 is a graph indicating the path taken in optimizing the oxide thickness (h) and heater length (L) parameters of the test device so as to converge on the optimum values of h and L which yield a numerical solution that agrees with the measured device surface signature to within a minimum RMS error.

For the specific device under consideration, FIG. 10 shows the path taken in the (h, L) parameter space to converge Onto the final values of h and L which yield a numerical solution that matches the measured surface signature to within the minimum RMS error. Of particular interest here is that the process of reaching the final result required 57 solutions of the full three-dimensional heat transfer problem, each of which was converged to less than 1% numerical error at the specified h and L values. It is obvious that such an approach would be impractical with traditional numerical solvers. The self-adaptive, ultra-fast computational engine used here and described in the inventor's '810 patent required approximately 20 minutes to solve this particular problem using a 3.4 GHz Pentium (R) 4 desktop PC.

Figure 11:
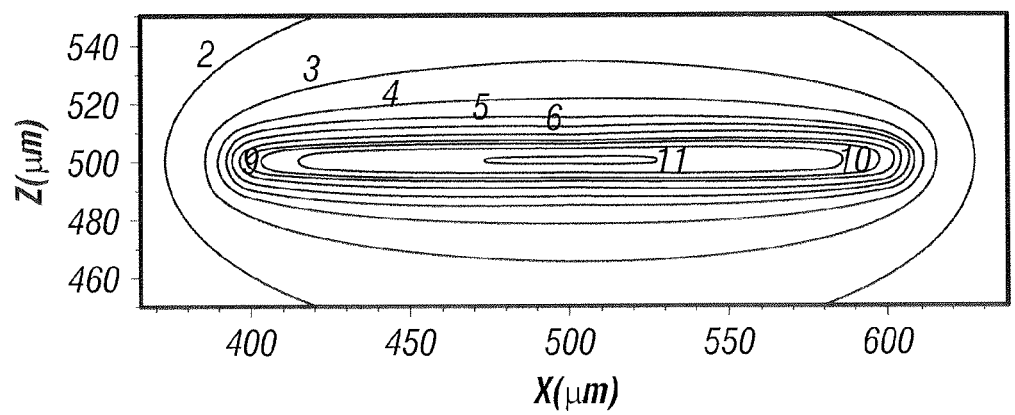
FIG. 11 is a contour of one slice of the optimal numerical solution for the surface temperature rise extracted from the full three-dimensional thermal solution for the test device.
Figure 12:
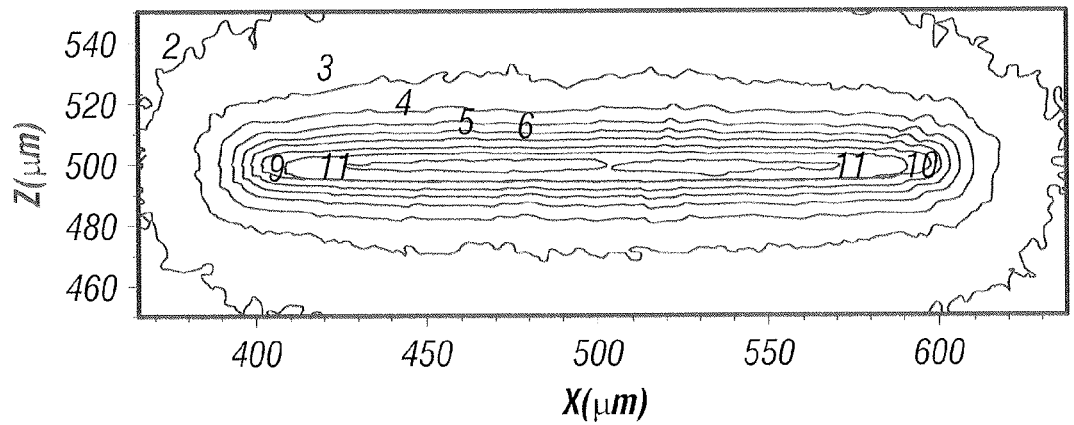
FIG. 12 is a contour plot of the experimentally measured temperature signature on the surface of the test device.

To compare the experimental and numerical surface temperature fields, a surface slice is extracted from the full 3D solution that corresponds to the size, location, and resolution of the experimental area. FIG. 11 shows the surface temperature slice at stage 9 (FIG. 10), which represents the "optimal" solution that is closest to the experimental signature shown in FIG. 12. While the agreement is very favorable, it is clear that the end effects give the experimental contours a more "rectangular" shape on the heater edges. A more sophisticated model of the power distribution at the pad-heater junction may be applied to further improve the agreement.

While the present invention discloses primarily a system for measuring the thermal field on a surface and computing the corresponding 3D internal thermal characterization, the same technique can be used for various other fields. For example, the electrical field across the surface of the heart is a function of its internal boundary conditions. If this 2D electrical surface field were measured with sufficient accuracy and an accurate representation of the internal structure of the heart cavity were obtained (CT-Scan, MRI, etc.), then the complete 3D characterization of the electrical field throughout the volume of the heart could be computed.

It will now be evident to those skilled in the art that there has been described herein an improved system and method for measuring the three-dimensional thermal characteristics of a semiconductor material. The ultimate benefit of the coupled experimental-numerical system is that it takes an inherently 2D experimental approach and provides a full 3D thermal characterization of the complete device. The optimization-based coupling ensures that the 3D solution is consistent with the 2D experimental signature within the chosen heat transfer model as defined by the combination of known and unknown (i.e., optimizable) parameters. FIG. 13 provides an example of the optimal 3D numerical solution. For clarity, only two slices are shown and the spatial domain is restricted to the region surrounding the heater, even though the computational domain is 1000×500×1000 µm. The horizontal slice is on the surface of the device and the vertical slice cuts across the mid-plane of the heater.

Although the invention hereof has been described by way of a preferred embodiment, it will be evident that other adaptations and modifications can be employed without departing from the spirit and scope thereof. For example, multiple lasers might be employed to conduct multiple simultaneous measurements in order to improve the speed and efficiency of the measurement process. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. An improved system for conducting a three-dimensional thermal characterization of a device, the system comprising:
    A thermoreflectance detection device for detecting light energy reflected from the surface of the device;
    an analyzer coupled to the thermoreflectance detection device for analyzing the thermoreflectance detection device output, the analyzer output representing the surface temperature distribution over a two-dimensional grid of the surface of the device; and
    a computer for determining the three-dimensional thermal profile of the device based on the two-dimensional surface temperature distribution.

2. The system of claim 1 further comprising a variable wavelength light source.

3. The system of claim 1 further comprising a CW laser.

4. The system of claim 1 wherein the thermoreflectance detection device is a CCD camera.

5. The system of claim 1 wherein the thermoreflectance detection device is a photoelectric device.

6. The system of claim 1 wherein the analyzer is chosen from the group consisting of a lock-in amplifier, a multimeter, and an oscilloscope.

7. The system of claim 1 wherein the computer also controls the thermoreflectance detection device and the analyzer.

8. The system of claim 1 further comprising a pulsed current source for powering the device.

9. An improved method for conducting a three-dimensional thermal characterization of an integrated circuit the method comprising:
    determining the thermoreflectance coefficient of an integrated circuit material;
    activating the integrated circuit;
    establishing an illumination wavelength that maximizes the thermoreflectance coefficient for the integrated circuit material;
    illuminating the integrated circuit material;
    measuring the illumination energy reflected from the surface of the integrated circuit material;
    determining a two-dimensional temperature field for the illuminated surface of the integrated circuit material; and
    computing a three-dimensional temperature characterization for a volume of the integrated circuit utilizing the two-dimensional temperature field.

10. The method of claim 9 wherein the thermoreflectance coefficient is determined by a device chosen from the group consisting of a CCD camera and a photoelectric device.

11. The method of claim 9 wherein the illumination energy is measured by a device chosen from the group consisting of a CCD camera and a photoelectric device.

12. The method of claim 9 wherein the integrated circuit is illuminated by a device chosen from the group consisting of a variable wavelength light source and a CW laser.

13. The method of claim 9 wherein the two-dimensional temperature field is determined using a device chosen from the group consisting of a lock-in amplifier, a multimeter, and an oscilloscope.

14. The method of claim 9 wherein the three-dimensional temperature field is computed using a grid nesting technique, wherein the grid nesting technique systematically and repeatedly refines a mesh to concentrate more grid points in challenging sub-regions of the overall temperature characterization, the grid nesting technique also using a physics-based automatic error predictor to focus on only those regions of the mesh that require further refinement.

15. An improved method for conducting a three-dimensional thermal characterization of an integrated circuit, the method comprising:
    (a) determining the thermoreflectance coefficient of an integrated circuit material;
    (b) positioning the integrated circuit beneath an illuminating device;
    (c) activating the integrated circuit at a predetermined modulation frequency;
    (d) establishing an illumination wavelength that maximizes the thermoreflectance coefficient of the material;
    (e) illuminating a spot on the surface of the integrated circuit material;
    (f) measuring the illumination energy reflected from the surface of the integrated circuit material;
    (g) moving the integrated circuit horizontally with respect to the illumination source so as to illuminate a different spot on the integrated circuit material;
    (h) repeating steps (e) through (g) as necessary to measure substantially the entire surface of the integrated circuit;
    (i) determining a two-dimensional temperature field for the illuminated surface of the integrated circuit material; and
    (j) computing a three-dimensional temperature characterization for a volume of the integrated circuit utilizing the two-dimensional temperature field.

16. The method of claim 15 wherein the thermoreflectance coefficient is determined by a device chosen from the group consisting of a CCD camera and a photoelectric device.

17. The method of claim 15 wherein the illumination energy is measured by a device chosen from the group consisting of a CCD camera and a photoelectric device.

18. The method of claim 15 wherein the integrated circuit is illuminated by a device chosen from the group consisting of a variable wavelength light source and a CW laser.

19. The method of claim 15 wherein the two-dimensional temperature field is determined using a device chosen from the group consisting of a lock-in amplifier, a multimeter, and an oscilloscope.

20. The method of claim 15 wherein the three-dimensional temperature field is computed using a grid nesting technique, wherein the grid nesting technique systematically and repeatedly refines a mesh to concentrate more grid points in challenging sub-regions of the overall temperature characterization, the grid nesting technique also using a physics-based automatic error predictor to focus on only those regions of the mesh that require further refinement.

* * * * *